July 5, 1966 L. A. PIDGEON 3,259,174
PROJECTION SCREEN
Filed Oct. 30, 1964 2 Sheets-Sheet 1
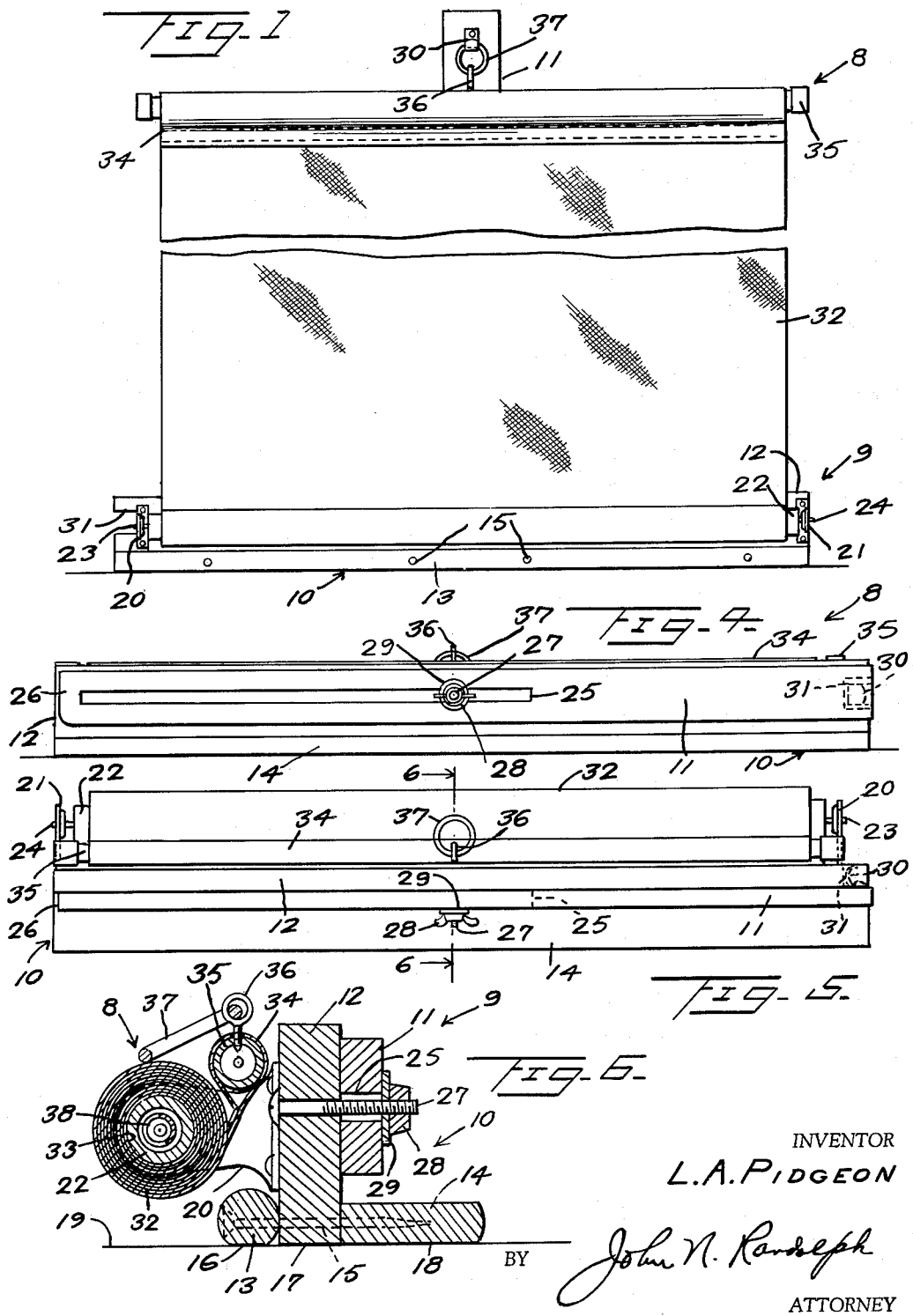
INVENTOR
L.A. PIDGEON
BY John N. Randolph
ATTORNEY

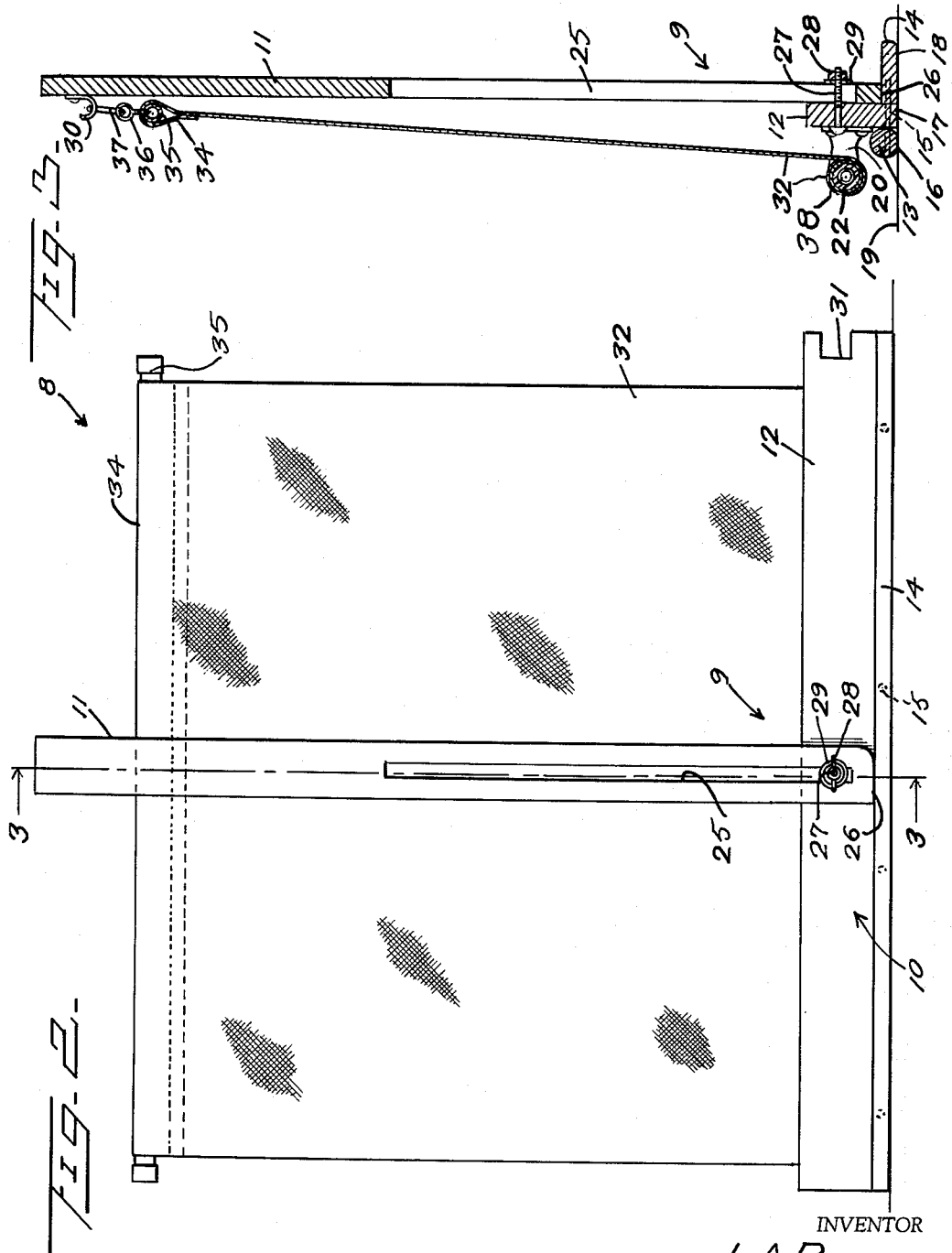

3,259,174
PROJECTION SCREEN
Luther A. Pidgeon, 316 N. Washington St.,
Knightstown, Ind.
Filed Oct. 30, 1964, Ser. No. 407,792
7 Claims. (Cl. 160—290)

This invention relates to a novel projection screen for viewing slides or motion pictures and more particularly to a novel supporting structure in which the screen may be stored in a very compact manner, when not in use, and by which the screen can be held extended for use.

More particularly, it is an object of the invention to provide a stand including a base supporting a spring operated roller on which the projection screen is wound and a standard which folds into the base, when not in use, and which may be positioned in an upright extended position relative to the base for holding the projection screen extended.

A further object of the invention is to provide a stand for a projection screen which by means of a simple adjustment may be erected to hold a screen extended.

Various other objects and advantages of the invention will hereinafter become more fully apparent from the following description of the drawings, illustrating a presently preferred embodiment thereof, and wherein:

FIGURE 1 is a fragmentary front elevational view showing the projection screen and stand in an extended position;

FIGURE 2 is an enlarged rear elevational view thereof;

FIGURE 3 is a cross sectional view, taken substantially along a plane as indicated by the line 3—3 of FIGURE 2;

FIGURE 4 is a rear elevational view showing the folded position of the projection screen and stand, on a somewhat enlarged scale relative to FIGURE 1;

FIGURE 5 is a top plan view of the parts as seen in FIGURE 4; and

FIGURE 6 is an enlarged cross section view, taken substantially along a plane as indicated by the line 6—6 of FIGURE 5.

Referring more specifically to the drawings, the projection screen in its entirety is designated generally 8 and includes a stand designated generally 9 composed of a base 10 and an upright or standard 11.

The base 10 includes a bar 12 which is disposed with one longitudinal edge portion thereof interposed between a rod 13 and a slat 14. Fastenings 15 extend through the rod 13, bar 12 and into the slat 14 for securing said parts immovably together. The parts 12, 13 and 14 are of the same length and each extends from end to end of the base 10. The rod 13 has a flattened bottom portion 16 extending from end to end thereof and disposed in the same plane as a bottom edge 17 of the bar 12 and a bottom face 18 of the slat 14, so that the surfaces 16, 17 and 19 define a flat underside of the base 10 which is adapted to rest on any suitable supporting surface 19, such as a tabletop, for supporting the projection screen 8.

A pair of shade roller brackets 20 and 21 is secured to one side of the bar 12 adjacent the ends thereof so as to extend outwardly therefrom above the rod 13. A spring operated roller 22 extends between and is supported by brackets 20 and 21 and has a stem 23 extending from one end thereof which is journaled in the bracket 20 and a stem 24 extending from its opposite end which engages non-rotatably in the bracket 21.

The upright or standard 11 is of approximately the same length as the base 10 and is disposed on the opposite side of the bar 12 above the slat 14. The standard 11 has a slot 25 extending from adjacent its end 26 to a point beyond midway of its ends. A headed bolt 27 extends through the bar 12 and slot 25 and has a wing nut 28 threaded thereon and washer 29 which is carried thereby and disposed between the wing nut and the outer side of the standard 11, as seen in FIGURES 3 and 6. The slot 25 is of a width substantially greater than the diameter of the bolt 27, so that when the nut 28 is loosened the standard 11 can be slid and pivot freely thereon for movement between its upright, operative position of FIGURES 1 to 3 and its folded inoperative position of FIGURES 4 to 6. In the operative position of the standard 11 its end 26 rests upon the upper surface of the slat 14, so that when the nut 28 is tightened to clamp the standard to the bar 12, said standard will be secured immovably in an upright position on the base. A hook 30 is secured to the standard 11 adjacent its other end and on the side thereof which faces the bar 12, so that the hook is disposed over the bar 12 and opens upwardly when the standard is in an upright position. One end of the bar 12 has an outwardly opening notch 31 (FIGURES 1 and 2) in which the hook 30 is received, as seen in FIGURES 4 and 5, when the standard 11 is clamped in a folded position by the fastening 27, 28 against and parallel to the bar 12. The parts 11, 12, 13 and 14 may be formed of any suitable lightweight rigid material.

A fabric strip 32 is wound on the roller 22 and has one end 33 anchored thereto in any conventional manner, and an opposite end which extends from the roller and which is provided with a hem 34 to receive an elongated rigid member 35. An eye fastening 36 extends through the outer part of the hem 34, midway of its ends, and is anchored in the intermediate portion of the member 35. A ring 37 engages through the eye of the fastening 36. The member 35 is of a length such that its ends protrude from the ends of the hem 34 and bear on the brackets 20 and 21 when the screen 32 is held fully wound on the roller 22 by the rewind spring 38 of said roller, in the folded position of the projection screen 8, as seen in FIGURES 4, 5 and 6. With the parts thus disposed, the projection screen 8 provides a very compact unit for storage or transportation.

To set up the projection screen 8 for use, the nut 28 is loosened so that the standard 11 can be slid from left to right of FIGURE 4 to disengage the hook 30 from the notch 31 and to position the bolt 27 in the end of the slot 25 located adjacent the standard end 26, after which the standard 11 is swung to its upright position and slid downwardly to position the end 26 thereof on the slat 14, after which the nut 28 is tightened for clamping the standard in its upright operative position. The ring 37 is then grasped and pulled upwardly for unwinding the screen 32 from the roller 22 and for extending it upwardly until the ring 37 can be engaged with the hook 30, as seen in FIGURE 1. The tension exerted by the spring 38 on the roller 22 will hold the screen 32 taut while the ring 37 is engaging the hook 30.

The standard 8 is returned to its folded position of FIGURES 4 to 6 by first disengaging the ring 37 from the hook 30 to allow the roller to rewind the screen 32 thereon, after which the nut 28 is loosened so that the standard 11 can be swung downwardly to a horizontal position and slid from right to left of FIGURE 4 to reposition the hook 30 in the notch 31, after which the nut 28 is tightened for clamping the standard in this position.

Various modifications and changes are contemplated and may obviously be resorted to without departing from the function or scope of the invention, as hereinafter defined by the appended claims.

I claim as my invention:

1. A projection screen comprising an elongated base having a bottom portion extending from end to end thereof and adapted to rest on a supporting surface, an elongated bar rising from said bottom portion and extending longitudinally thereof, said bar having opposite sides disposed substantially perpendicular to the plane of the bottom portion and between and spaced from the side edges thereof, a pair of longitudinally spaced shade roller brackets fixed to the bar and projecting laterally from one of said sides above said bottom portion, a spring operated roller rotatably supported by said brackets, a fabric screen member wound on and having one end secured to the roller, an elongated standard disposed on the other side of said bar above said bottom portion, means slidably and pivotally connecting the standard to the bar for securing the standard in an upright operative position relative to the base or in a folded position against the bar and substantially parallel to the base, and means detachably connecting the other end of the screen member to an upper part of the standard, in the operative position of the standard, for holding the screen member in an extended unwound position against the spring action of the roller.

2. A projection screen as in claim 1, said means slidably and pivotally connecting the standard to the bar including an elongated slot formed in the standard, a bolt extending through the bar and through said slot on which the standard is slidably and pivotally mounted, and a nut threadedly engaging said bolt for clamping the standard to the bar in either its operative or its folded position.

3. A projection screen as in claim 2, said standard having an end bearing flush on a part of said bottom portion in the operative position of the standard.

4. A projection screen as in claim 1, said bottom portion including two members extending from end to end of the base, the bottom edge portion of the bar being disposed between and secured to said members.

5. A projection screen as in claim 1, said means connecting a screen member detachably to the standard including a hook supported by an upper part of the standard and a ring connected to the screen member and detachably engaging said hook.

6. A projection screen as in claim 5, a hem defining said last mentioned end of the screen member, a rigid member extending through said hem and having end portions extending beyond the ends thereof and engaging said brackets when the screen member is fully wound on the roller.

7. A projection screen as in claim 1, said means connecting the screen member detachably to the standard including a hook supported by an upper part of the standard and a ring connected to the screen member and detachably engaging the hook, and said bar having a notch opening outwardly of one end thereof to receive the hook in the folded position of the standard.

No references cited.

HARRISON R. MOSELEY, *Primary Examiner.*

P. M. CAUN, *Assistant Examiner.*